United States Patent [19]
Kato et al.

[11] Patent Number: 5,146,789
[45] Date of Patent: Sep. 15, 1992

[54] TURBINE FLOWMETER

[75] Inventors: Takashi Kato, Kawasaki; Yutaka Morita, Takarazuka; Takeshi Yamaguchi, Kyoto; Kazuo Tsuge, Yokohama; Kyoji Imamura, Tokyo; Yoshio Kawai, Yokohama; Hiroaki Hasegawa, Yokohama; Hiroyuki Amemori, Kawasaki, all of Japan

[73] Assignee: Tokico Ltd., Kanagawa, Japan

[21] Appl. No.: 621,584

[22] Filed: Dec. 3, 1990

Related U.S. Application Data

[60] Continuation-in-part of Ser. No. 469,277, Jan. 24, 1990, abandoned, which is a division of Ser. No. 310,748, Feb. 14, 1989, Pat. No. 4,903,533, which is a continuation-in-part of Ser. No. 106,175, Sep. 30, 1987, Pat. No. 4,918,996.

[30] Foreign Application Priority Data

Sep. 30, 1986 [JP] Japan .............. 61-150145[U]
Sep. 30, 1986 [JP] Japan .............. 61-231527

[51] Int. Cl.$^5$ .................................. G01F 1/10
[52] U.S. Cl. .................................. 73/861.91
[58] Field of Search ................ 73/861.91, 861.92; 184/64, 102; 384/240, 241, 246, 402, 408

[56] References Cited

U.S. PATENT DOCUMENTS 2,629,605 2/1953 Krisch .
3,766,780 10/1973 Aizawa et al. .
4,103,759 8/1978 Erich et al. .

FOREIGN PATENT DOCUMENTS 343394 2/1931 United Kingdom .

Primary Examiner—Herbert Goldstein
Attorney, Agent, or Firm—Michael N. Meller

[57] ABSTRACT

A turbine flowmeter includes an impeller rotatably provided within a flow passage through which a fluid to be measured flows and comprising a rotary shaft which rotates together with the impeller, a pair of bearing part having bearing surfaces for axially supporting the rotary shaft, a holding part for holding the bearing part and provided on the flow passage, an oil accumulating space defined by an end portion of the rotary shaft and bearing surfaces facing respective sides of the end portion, an oil accumulating part provided on the holding part and filled with the lubricating oil to be supplied to the oil accumulating space, an oil supplying part for supplying oil to the oil accumulating space which part comprises a capillary part connected on one end direct to the oil accumulating part and communicated on the other end to the space, wherein the lubricating oil is supplied to the space via the oil supplying part from the oil accumulating part by capillarity introduced in the oil accumulating part and the space, and wherein the surface tension of the lubricating oil in the space is equal to or larger than the surface tension of the lubricating oil in the oil accumulating part.

9 Claims, 10 Drawing Sheets

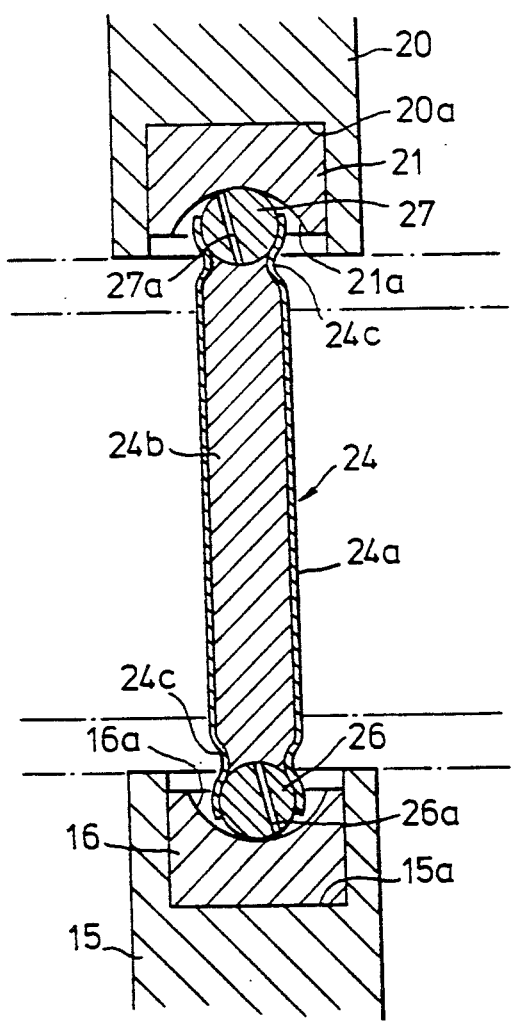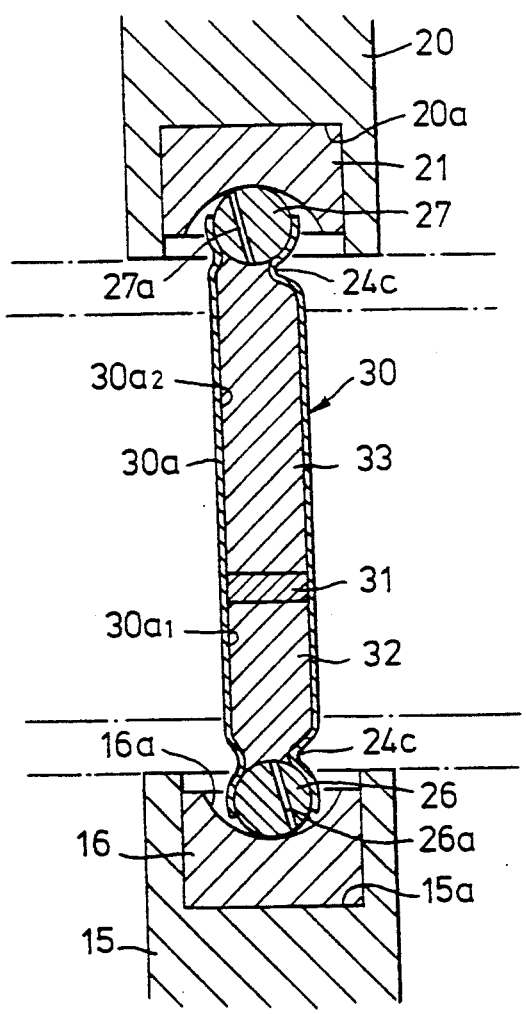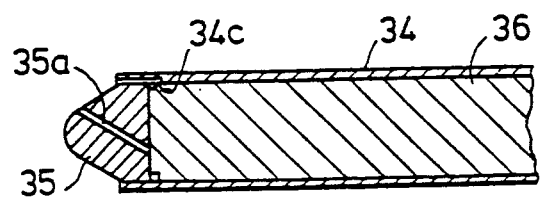

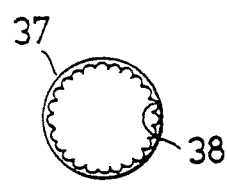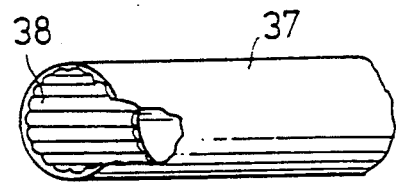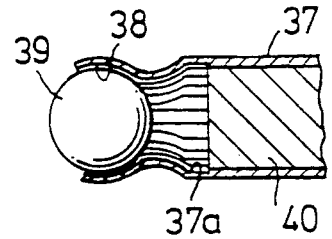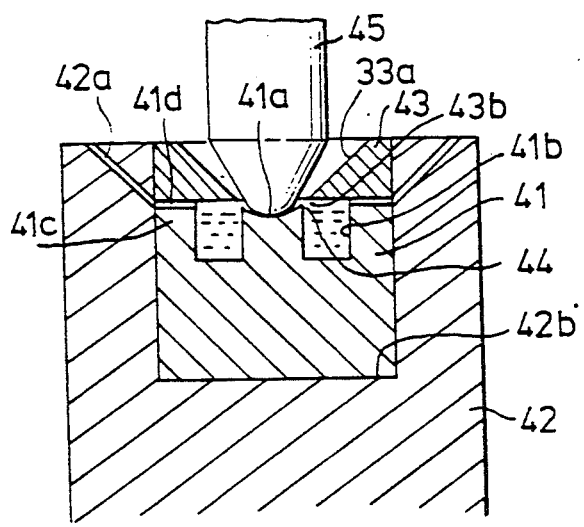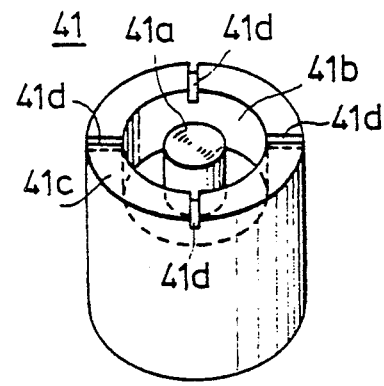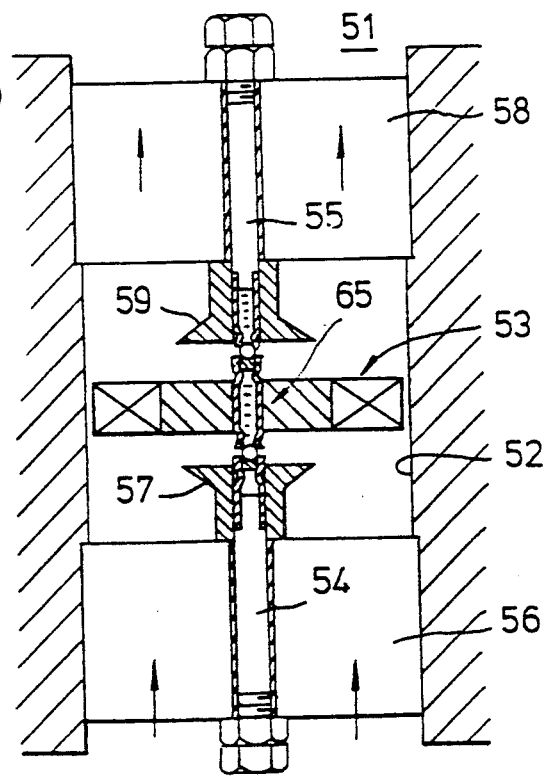

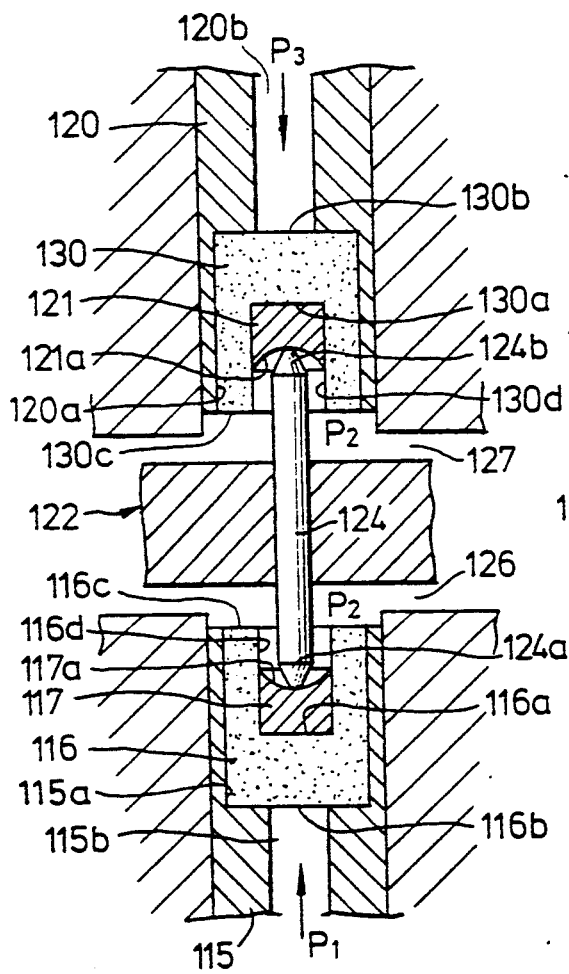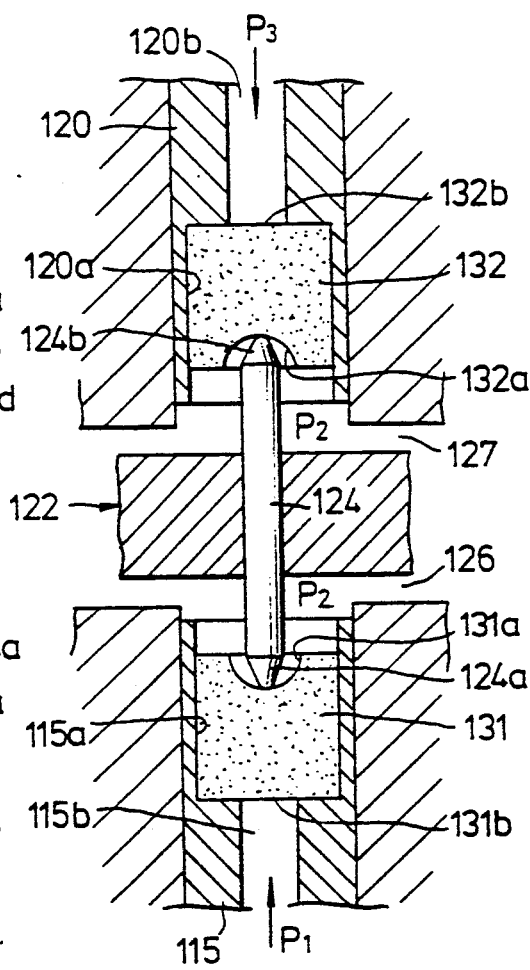

TURBINE FLOWMETER

The present application is a Continuation-In-Part Application of a U.S. Pat. application Ser. No. 469,277, now abandoned, entitled "TURBINE FLOWMETER" filed Jan. 24, 1990, Ser. No. 4,69,277 is a 37 C.F.R. 1.60 Divisional application of Ser. No. 310,748, now Pat. No. 4,903,533, Ser. No. 310,748 is a Continuation-in-part application of Ser. No. 106,175, filed Sep. 30, 1987 (now U.S. Pat. No. 4,918,996).

BACKGROUND OF THE INVENTION

The present invention generally relates to turbine flowmeters, and more particularly to a turbine flowmeter having such a construction that a rotary shaft of an impeller can be supported stably for a long period of time.

Conventionally, in a turbine flowmeter for measuring a flow quantity of a fluid such as a gas supplied through a gas pipe arrangement, a pair of pivot bearings support respective ends of a rotary shaft projecting from both sides of a hub of an impeller. In order to improve the measuring accuracy of the turbine flowmeter especially at the start of the measuring operation, two cone shaped members are respectively provided on an upstream side and a downstream side of the hub of the impeller so as to confront the two sides of the hub, and the pivot bearings are provided within the two cone shaped members. The two ends of the rotary shaft respectively have a conical shape, and a bearing surface of each pivot bearing has a hemispherical shape in correspondence with the conical ends of the rotary shaft.

However, in the bearing parts of the conventional turbine flowmeter, the rotary shaft rotates on the bearing surfaces of the pivot bearings together with the impeller when measuring the flow quantity of the fluid. For this reason, a large force acts on the bearing surfaces from the rotary shaft. As a result, both the bearing surfaces and the ends of the rotary shaft wear out due to friction after the turbine flowmeter is used for a certain period of time, and there is a problem in that the durability of the pivot bearings and the rotary shaft is unsatisfactory.

In order to solve the problem of wear due to friction, it is possible to conceive a method of accumulating a lubricating oil on the bearing surfaces. But when the quantity of the lubricating oil is too small, the lubrication is insufficient. On the other hand, the lubricating oil acts as a resistance on the rotating rotary shaft when the quantity of the lubricating oil is too large. Therefore, when the quantity of the lubricating oil is too large, there are problems in that the measuring accuracy of the turbine flowmeter becomes poor, and the excess lubricating oil is scattered to the surroundings of the bearing parts.

SUMMARY OF THE INVENTION

Accordingly, it is a general object of the present invention to provide a novel and useful turbine flowmeter in which the problems described heretofore are eliminated.

Another and more specific object of the present invention is to provide a turbine flowmeter in which an oil accumulating part is provided within a rotary shaft of an impeller, and a lubricating oil in the oil accumulating part is supplied to bearing parts by use of the centrifugal force of the rotary shaft depending on a rotational speed of the rotary shaft. According to the turbine flowmeter of the present invention, the lubricating oil is supplied to the bearing parts in small quantities depending on the rotational speed of the rotary shaft, and the rotary shaft rotates stably and smoothly even when measuring the flow quantity from a small flow quantity region to a large flow quantity region. Therefore, the flow quantity of a fluid can constantly be measured in a satisfactory state. In addition, the serviceable life of the turbine flowmeter is extended because the friction between the rotary shaft and the bearing parts is suppressed by the supply of the lubricating oil, and the turbine flowmeter can maintain the same stable measuring accuracy for a long period of time. Moreover, it is possible to positively prevent a large quantity of the lubricating oil from being supplied at one time, and for this reason, the lubricating oil will not be scattered to the surroundings of the bearing parts. Since the lubricating oil is supplied to the bearing parts in small quantities, the lubrication can be carried out continuously for a long period of time, thereby simplifying the maintenance of the turbine flowmeter such as replenishing the lubricating oil in the oil accumulating part.

Still another object of the present invention is to provide a turbine flowmeter in which minute gaps are provided in vicinities of bearings, and a lubricating oil is supplied to bearing parts by use of capillarity introduced in the minute gaps.

A further object of the present invention is to provide a turbine flowmeter in which a lubricating oil is supplied to bearing parts by use of minute vibrations of a rotary shaft which rotates together with an impeller.

Another object of the present invention is to provide a turbine flowmeter in which a lubricating oil is supplied in appropriate quantities to bearing parts through a fiber yarn.

Still another object of the present invention is to provide a turbine flowmeter in which a lubricating oil is supplied to bearing parts by use of a pressure difference between a fluid pressure in a vicinity of an impeller and fluid pressures at upstream and downstream sides of the turbine flowmeter.

A further object of the present invention is to provide a turbine flowmeter comprising an impeller rotatably provided within a flow passage through which a fluid to be measured flows and comprising a rotary shaft which rotates together with the impeller, a pair of bearing means having bearing surfaces for axially supporting the rotary shaft, a holding means for holding the bearing means and provided on the flow passage, an oil accumulating space defined by an end portion of the rotary shaft and bearing surfaces facing respective sides of the end portion, an oil accumulating means provided on the holding means and filled with the lubricating oil to be supplied to the oil accumulating space, and an oil supplying means for supplying oil to the oil accumulating space which means comprises a capillary means connected on one end direct to the oil accumulating means and communicated on the other end to the space, wherein the lubricating oil is supplied to the space via the oil supplying means from the oil accumulating means by capillarity introduced in the oil accumulating means and the space, and wherein the surface tension of the lubricating oil in the space is equal to or larger than the surface tension of the lubricating oil in the oil accumulating means. According to the turbine flowmeter of the present invention, there is no need to provide a communication hole exclusively for communicating the first and second capillary means. Hence, the construction of the turbine flowmeter is relatively simple.

Other objects and further features of the present invention will be apparent from the following detailed description when read in conjunction with the accompanying drawings.

BRIEF DESCRIPTION OF THE DRAWINGS

FIG. 2 is a view in vertical cross section showing a rotary shaft and bearing parts of the turbine flowmeter shown in FIG. 1;

FIG. 3 is a view in vertical cross section showing an essential part of a first modification of the first embodiment;

FIG. 4 is a cross sectional view showing an essential part of a second modification of the first embodiment;

FIGS. 5A through 5C are a front view, a perspective view in part and a cross sectional view in part respectively showing an essential part of a third modification of the first embodiment;

FIGS. 6 and 7 are a cross sectional view and a perspective view respectively showing an essential part of a fourth modification of the first embodiment;

FIG. 8 is a view in vertical cross section showing an essential part of a second embodiment of the turbine flowmeter according to the present invention;

FIG. 16 is a view in vertical cross section showing an essential part of the fourth embodiment;

FIG. 17 is a view in vertical cross section showing an essential part of a modification of the fourth embodiment;

DESCRIPTION OF THE PREFERRED EMBODIMENTS

Figure 1:
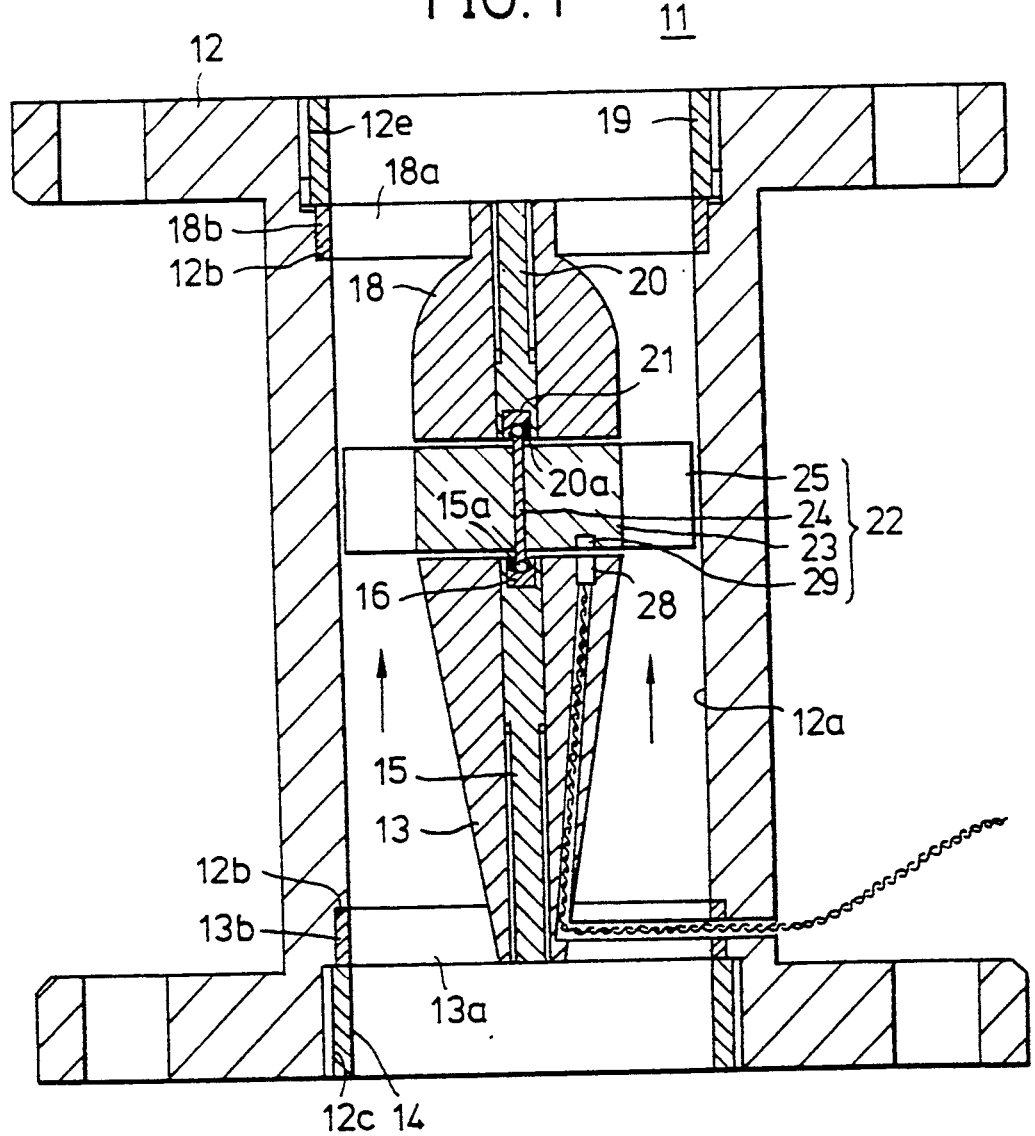
FIG. 1 is a view in vertical cross section showing a first embodiment of the turbine flowmeter according to the present invention.

FIG. 1 shows a first embodiment of the turbine flowmeter according to the present invention. In FIG. 1, a main flowmeter structure 12 of a turbine flowmeter 11 is located in a pipe arrangement (not shown). A fluid such as a gas the flow quantity of which is to be measured is supplied to the pipe arrangement and flows through the flowmeter 11 as indicated by arrows.

An upstream side cone (hereafter simply referred to as an upstream cone) 13 is inserted into a flow passage 12a of the main flowmeter structure 12 from a lower part of the main flowmeter structure 12 in FIG. 1. The upstream cone 13 has a plurality of support beams 13a and a ring portion 13b connected to the support beams 13a, and the ring portion 13b is fitted into a stepped portion 12b of the main flowmeter structure 12. In addition, the upstream cone 13 is fixed in position by a securing ring 14 which is screwed into an internal thread portion 12c provided at the lower part of the main flowmeter structure 12.

A bearing metal fitting 15 is screwed into and fixed in a core portion of the upstream cone 13. As shown in FIG. 2, a bearing hole 15a having a predetermined depth is provided on an upper end of the bearing metal fitting 15, and a pivot bearing 16 is embedded in the bearing hole 15a. The pivot bearing 16 is made of a cemented carbide or a gem such as sapphire.

A downstream side cone (hereinafter simply referred to as a downstream cone) 18 is inserted into the flow passage 12a of the main flowmeter structure 12 from an upper part of the main flowmeter structure 12 in FIG. 1. The downstream cone 18 has a plurality of support beams 18a and a ring portion 18b connected to the support beams 18a, and the ring portion 18b is fitted into a stepped portion 12d of the main flowmeter structure 12. In addition, the downstream cone 18 is fixed in position by a securing ring 19 which is screwed into an internal thread portion 12e provided at the upper part of the main flowmeter structure 12.

A bearing metal fitting 20 is screwed into and fixed in a core portion of the downstream cone 18. As shown in FIG. 2, a bearing hole 20a having a predetermined depth is provided on a lower end of the bearing metal fitting 20, and a pivot bearing 21 is embedded in the bearing hole 20a. The pivot bearing 21 is also made of a cemented carbide or a gem such as sapphire. For example, concave (approximately hemispherical) bearing surfaces 16a and 21a shown in FIG. 2 are formed at centers of the respective pivot bearings 16 and 21.

A turbine rotor (impeller) 22 comprises a rotor hub 23, a rotary shaft 24 which penetrates a center hole in the rotor hub 23 and is fixed to the rotor hub 23, and a plurality of blades 25 fixed on an outer peripheral surface of the rotor hub 23.

As shown in FIG. 2, the rotary shaft 24 comprises a pipe 24a, and balls 26 and 27 which are fixed at respective ends of the pipe 24a by a drawing or squeezing process. The balls 26 and 27 are made of a cemented carbide or a gem such as sapphire, and respectively have minute penetrating holes 26a and 27a penetrating therethrough. The penetrating holes 26 and 27 are inclined by predetermined angels with respect to an axial direction of the pipe 24a, and respectively communicate the inside of the pipe 24a to the outside. A filling member 24b fills the inside of the pipe 24a. The filling member 24b is made of a fiber-like material such as a felt, a porous material such as sintered metal, and the like. The filling member 24b is infiltrated with a lubricating oil. In order to make the pressure inside the pipe 24a the same as the external pressure, air ducts 24c are provided at the constricted portions of the pipe 24a.

The turbine rotor 22 is arranged so that the balls 26 and 27 on both ends of the rotary shaft 24 are axially supported by the bearing surfaces 16a and 21a of the respective pivot bearings 16 and 21.

As shown in FIG. 1, a magnetic sensor 28 which is used as a pickup is embedded in an upper surface of the upstream cone 13, and a magnet 29 is embedded in a lower surface of the rotor hub 23 at such a position that the magnet 29 confronts the magnetic sensor 28 at a predetermined rotational position of the rotor hub 23. Accordingly, the flow quantity of the fluid flowing through the flow passage 12a is measured by magnetically detecting by use of the magnetic sensor 28 the magnet 29 which rotates together with the turbine rotor 22 depending on the flow quantity of the fluid.

In FIG. 1, the blades 25 of the turbine rotor 22 are rotated by the fluid as the fluid flows through the flow passage 12a within the main flowmeter structure 12. Accordingly, the turbine rotor 22 rotates according to the flow quantity of the fluid in a state where the balls 26 and 27 of the rotary shaft 24 are in contact with and supported by the bearing surfaces 16a and 21a of the respective pivot bearings 16 and 21. The turbine rotor 22 rotates satisfactorily from the low flow quantity region to the high flow quantity region, and is rotatable with a high sensitivity even when the flow quantity of fluid is small.

The lubricating oil infiltrating the filling member 24b inside the pipe 24a is evenly distributed within the entire filling member 24b due to capillarity. Since the filling member 24b is in contact with portions of the balls 26 and 27 including the penetrating holes 26a and 27a, the penetrating holes 26a and 26b are also infiltrated with the lubricating oil due to capillarity.

Accordingly, when measuring the flow quantity of the fluid, the turbine rotor 22 rotates and a centrifugal force acts on the lubricating oil within the penetrating holes 26a and 27a of the balls 26 and 27 which are located on the ends of the rotary shaft 24. As a result, the lubricating oil within the penetrating holes 26a and 27a oozes out in small quantities depending on the rotational speed of the rotary shaft 24 and lubricates the bearing surfaces 16a and 21a of the pivot bearings 16 and 21.

When measuring a small flow quantity, the supply of the lubricating oil to the bearing surfaces 16a and 21a of the pivot bearings 16 and 21 is limited to an extremely small quantity because the rotational speed of the rotary shaft 24 is small in this case. On the other hand, when measuring a large flow quantity, the supply of the lubricating oil to the bearing surfaces 16a and 21a slightly increases compared to the case where the small flow quantity is measured, since the rotational speed of the rotary shaft 24 increases. In other words, the lubricating oil infiltrating the filling member 24b is supplied to the bearing surfaces 16a and 21a in appropriate small quantities dependent on the rotational speed of the rotary shaft 24.

The lubricating oil is constantly supplied between the ball 26 and the bearing surface 16a and between the ball 27 and the bearing surface 21a in appropriate small quantities, and thus, the rotary shaft 24 can always rotate smoothly and stably. Moreover, the friction between the ball 26 and the bearing surface 16a and the friction between the ball 27 and the bearing surface 21a are reduced by the supply of the lubricating oil, and the wear of the balls 26 and 27 and the bearing surfaces 16a and 21a due to friction is effectively suppressed. For this reason, the serviceable life of the turbine flowmeter 11 is extended, and it is possible to accurately and stably measure the flow quantity of the fluid for a long period of time.

It is possible to vary the quantities with which the lubricating oil is supplied to the bearing surfaces 16a and 21a of the pivot bearings 16 and 21, by varying the inclination of the penetrating holes 26a and 27a in the balls 26 and 27 with respect to the axial direction of the pipe 24a.

FIG. 3 shows an essential part of a first modification of the first embodiment. In FIG. 3, those parts which are the same as those corresponding parts in FIGS. 1 and 2 are designated by the same reference numerals, and a description thereof will be omitted. In the first modification of the first embodiment, a partitioning plate 31 partitions the inside a pipe 30a of a rotary shaft 30 into a lower chamber 30a1 and an upper chamber 30a2. A filling member 32 fills the lower chamber 30a1, and a filling member 33 fills the upper chamber 30a2. These filling members 32 and 33 are also infiltrated with a lubricating oil.

Accordingly, the lubricating oil of the filling member 32 within the lower chamber 30a1 is supplied to the penetrating hole 26a of the ball 26, and the lubricating oil of the filling member 33 within the upper chamber 30a2 is supplied to the penetrating hole 27a of the ball 27. In other words, the lubricating oil is independently supplied to the penetrating holes 26a and 27a from the respective filling members 32 and 33. For this reason, it is possible to prevent insufficient lubrication at the bearing surfaces 16a and 21a of the pivot bearings 16 and 21. As in the case of the first embodiment, the lubricating oil is supplied between the ball 26 and the bearing surface 16a and between the ball 27 and the bearing surface 21a due to the capillarity introduced in the penetrating holes 26a and 27a and due to the centrifugal force acting on the lubricating oil within the penetrating holes 26a and 27a by the rotation of the rotary shaft 30.

FIG. 4 shows an essential part of a second modification of the first embodiment. In the second modification of the first embodiment, a tip member 35 having a rounded surface is fixed to an end of a pipe 34 of the rotary shaft by a drawing or squeezing process. A penetrating hole 35a penetrates the tip member 35. This penetrating hole 35a is inclined with respect to the axial direction of the pipe 34 and communicates the inside of the pipe 34 to the outside. A filling member 36 infiltrated with a lubricating oil fills the inside of the pipe 34. When the rotary shaft rotates, the lubricating oil oozes out to the surface of the tip member 35 through the penetrating hole 35a due to the capillarity introduced in the penetrating hole 35a and due to the centrifugal force acting on the lubricating oil within the penetrating hole 35a. In FIG. 4, the illustration of the other end of the pipe 34 is omitted for convenience' sake.

FIGS. 5A through 5C show essential parts of a third modification of the first embodiment. In the third modification of the first embodiment, a pipe 37 of the rotary shaft has an inner wall 37a which is provided with a plurality of grooves 38 in a vicinity of the open end of the pipe 37. The grooves 38 extend generally along the axial direction of the pipe 37 and are formed for the full circumference of the inner wall 37a in the vicinity of the open end. A ball 39 is fixed to an end of the pipe 37 by a drawing process as shown in FIG. 5C. A filling member 40 which is infiltrated with a lubricating oil fills the inside of the pipe 37, and the lubricating oil oozes out to the surface of the ball 39 through the grooves 38. There is no need to provide an air duct because the inside of the pipe 37 communicates to the outside through the grooves 38.

The lubricating oil concentrates better on the inner wall of the pipe 37 due to the centrifugal force when the rotary shaft rotates, by providing the grooves 38 for the entire length of the pipe 37 and making the depth of the grooves 38 deeper toward the ends of the pipe 37 compared to the depth at a central portion along the axial direction of the pipe 37. Furthermore, since the lubricating oil is guided by the grooves 28 in the inner wall of the pipe 37 in this case, the lubricating oil more positively oozes out to the surface of the ball 39.

FIGS. 6 and 7 show essential parts of a fourth modification of the first embodiment. In the fourth modification of the first embodiment, a pivot bearing 41 shown separately in FIG. 7 comprises a bearing surface 41a, a ring shaped groove 41b surrounding the bearing surface 41a, an outer peripheral portion 41c surrounding the ring shaped groove 41b, and a plurality of grooves 41d in the outer peripheral portion 41c for communicating the ring shaped groove 41b to the outside. The pivot bearing 41 is embedded in a bearing hole 42b of a bearing metal fitting 42, and a ring shaped cap 43 is fitted on top of the pivot bearing 41. The bearing metal fitting 42 comprises a plurality of air ducts 42a which communicate to the grooves 41d of the pivot bearing 41. The cap 43 has a tapered center hole 43a having a lower edge 43b. The lower edge 43b of the tapered center hole 43a is separated slightly from the bearing surface 41a thereby forming a minute gap 44.

The ring shaped groove 41b of the pivot bearing 41 accumulates a lubricating oil. Accordingly, the lubricating oil is supplied between the bearing surface 41a and a rounded tip end of a rotary shaft 45 in small quantities due to the capillarity introduced in the minute gap 44.

Next, a description will be given on a second embodiment of the turbine flowmeter according to the present invention, by referring to FIG. 8. In FIG. 8, a turbine flowmeter 51 is located within a flow passage 52 through which a fluid to be measured flows. A turbine rotor (impeller) 53 is supported on shafts 54 and 55 respectively provided on an upstream side and a downstream side of the flow passage 52. The shaft 54 is supported at a center of the flow passage 52 by a support member 56, and an upstream cone 57 is provided above the support member 56. The shaft 55 is supported at the center of the flow passage 52 by a support member 58, and a downstream cone 59 is provided below the support member 58.

Figure 9:
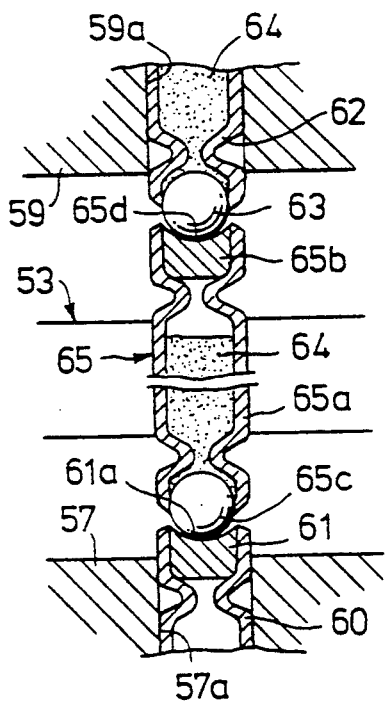
FIG. 9 is a view in vertical cross section showing an essential part of the second embodiment.

As shown in FIG. 9, a pipe 60 is fixedly inserted into a center hole 57a of the upstream cone 57, and a pivot bearing 61 is fixed on an end of the pipe 60 by a drawing or squeezing process. On the other hand, a pipe 62 is fixedly inserted into a center hole 59a of the downstream cone 59, and a ball 63 is positioned on an end of the pipe 62 by a drawing or squeezing process. A lubricating oil 64 fills the inside of the pipe 62.

A rotary shaft 65 of the turbine rotor 53 comprises a pipe 65a having a pivot bearing 65b fixed on an upper end by a drawing or squeezing process and a ball 65c positioned on a lower end by a drawing or squeezing process. The lubricating oil 64 also fills the inside of the pipe 65a. The rotary shaft 65 is axially supported in a state where the ball 65c on the lower end of the pipe 65a makes contact with a bearing surface 61a of the pivot bearing 61 and a bearing surface 65d of the pivot bearing on the upper end of the pipe 65a makes contact with the ball 63.

When measuring the flow quantity of the fluid, the turbine rotor 53 rotates at a high rotational speed together with the rotary shaft 65 in the case where the flow quantity is large. When the rotary shaft 65 rotates at the high rotational speed, the rotary shaft 65 undergoes minute vibrations. Since the balls 63 and 65c are simply positioned at the ends of the respective pipes 62 and 65a by the drawing or squeezing process, these balls 63 and 65c can undergo slight deviation or rotation within the pipes 62 and 65a when the rotary shaft 65 vibrates. When the balls 63 and 65c undergo the slight deviation or rotation, the lubricating oil 64 oozes out to the surfaces of the balls 63 and 65c.

Because the lubricating oil 64 is supplied between the ball 63 and the bearing surface 65d and between the ball 65c and the bearing surface 61a when the rotary shaft 65 rotates at the high rotational speed, it is possible to suppress wear of the balls 63 and 65c and the bearing surfaces 65d and 61a and extend the serviceable life of the turbine flowmeter 51. On the other hand, the lubricating oil 64 is only supplied in extremely small quantities when the turbine rotor 53 rotates at a low rotational speed, and it is possible to save the lubricating oil 64. When the turbine flowmeter 51 is not in use, it is possible to prevent the lubricating oil 64 from oozing out to the bearing surfaces 61a and 65a.

Figure 10:
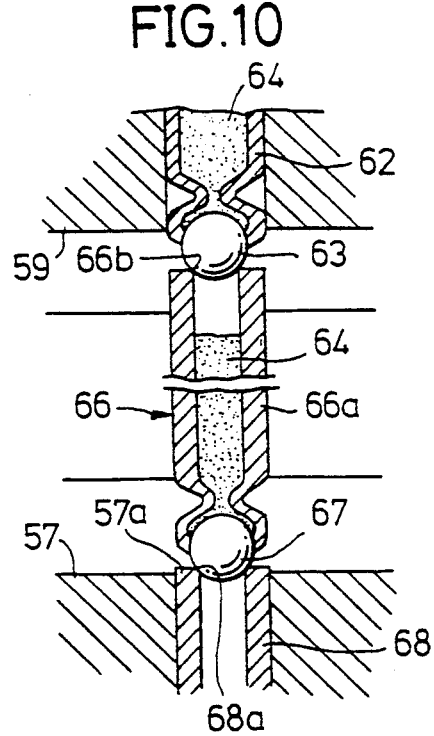
FIGS. 10, 11 and 12 are views in vertical cross section respectively showing essential parts of first, second and third modifications of the second embodiment.

FIG. 10 shows a first modification of the second embodiment. In FIG. 10, those parts which are the same as those corresponding parts in FIG. 9 are designated by the same reference numerals, and a description thereof will be omitted. In FIG. 10, a rotary shaft 66 comprises a pipe 66a and a tapered portion 66b formed on an inner wall at an upper end of the pipe 66a. A ball 67 is positioned on a lower end of the pipe 66a by a drawing or squeezing process. A pipe 68 is fixedly inserted into the center hole 57a of the upstream cone 57, and a tapered portion 68a is formed on an inner wall at an upper end of the pipe 68. The rotary shaft 66 is axially supported in a state where the ball 63 is supported on the tapered portion 66b of the pipe 66a and the ball 67 is supported on the tapered portion 68a of the pipe 68.

The lubricating oil 64 fills the inside of the pipe 66a of the rotary shaft 66. The lubricating oil 64 is supplied in small quantities to the surface of the balls 63 and 67 when the rotary shaft 66 rotates at a high rotational speed, because the balls 63 and 67 deviate slightly due to the minute vibrations of the rotary shaft 66. For this reason, the lubricating oil 64 is supplied between the tapered portion 66b and the ball 63 and between the tapered portion 68a and the ball 67, and the rotary shaft 66 rotates stably and smoothly.

The tapered portions 66b and 68a may be coated with teflon (registered trademark), or the pipes 66a and 68 may be made of ceramics, so as to minimize the wear of these parts due to friction.

Figure 11:
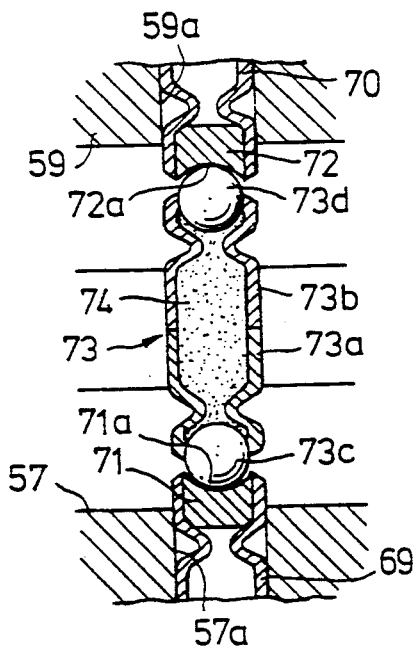

FIG. 11 shows a second modification of the second embodiment. In FIG. 11, a pivot bearing 71 is fixed to one end of a pipe 69 which is fixedly inserted into the center hole 57a of the upstream cone 57 by a drawing or squeezing process. Similarly, a pivot bearing 72 is fixed to one end of a pipe 70 which is fixedly inserted into the center hole 59a of the downstream cone 59. A rotary shaft 73 of the turbine rotor is made up of a pair of pipes 73a and 73b which are connected. A ball 73c is fixed to one end of the pipe 73a by a drawing or squeezing process, and a ball 73d is fixed to one end of the pipe 73b by a drawing or squeezing process. In addition, a filling member 74 infiltrated with a lubricating oil fills the inside of the connected pipes 73a and 73b constituting the rotary shaft 73.

The rotary shaft 73 is axially supported in a state where the ball 73c is supported on a bearing surface 71a of the pivot bearing 71 and the ball 73d is supported on a bearing surface 72a of the pivot bearing 72. Hence, when the rotary shaft 73 rotates at a high rotational speed, the balls 73c and 73d undergo slight deviation due to the minute vibrations of the rotary shaft 73, and the lubricating oil in the filling member 74 is supplied between the ball 73c and the bearing surface 71a and between the ball 73d and the bearing surface 72a. Therefore, the rotary shaft 73 rotates stably and smoothly.

Figure 12:
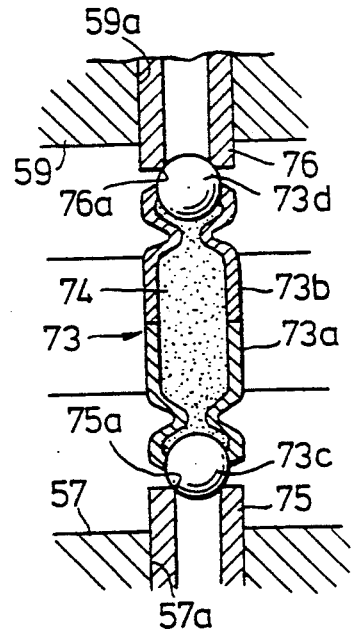

FIG. 12 shows a third modification of the second embodiment. In FIG. 12, those parts which are the same as those corresponding parts in FIG. 11 are designated by the same reference numerals. In FIG. 12, a tapered portion 75a is formed on the inner wall of one end of a pipe 75 which is fixedly inserted into the center hole 57a of the upstream cone 57. Similarly, a tapered portion 76a is formed on the inner wall of one end of a pipe 76 which is fixedly inserted into the center hole 59a of the downstream cone 59. The rotary shaft 73 is axially supported in a state where the ball 73c is supported on the tapered portion 75a of the pipe 75 and the ball 73d is supported on the tapered portion 76a of the pipe 76. Hence, when the rotary shaft 73 rotates at a high rotational speed, the balls 73c and 73d undergo slight deviation due to the minute vibrations of the rotary shaft 73, and the lubricating oil in the filling member 74 is supplied between the ball 73c and the tapered portion 75a and between the ball 73d and the tapered portion 76a. Thus, the rotary shaft 73 rotates stably and smoothly.

Figure 13:
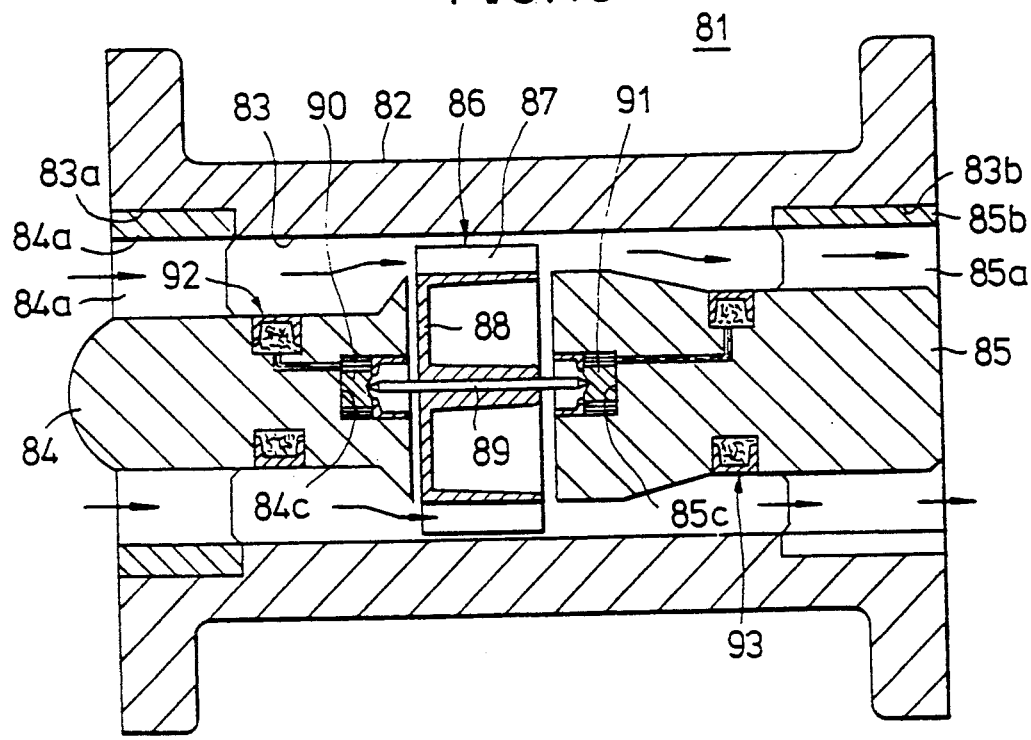
FIG. 13 is a view in vertical cross section showing a third embodiment of the turbine flowmeter according to the present invention.

FIG. 13 shows a third embodiment of the turbine flowmeter according to the present invention. In FIG. 13, a turbine flowmeter 81 comprises a main flowmeter structure 82, and a flow passage 83 through which a fluid to be measured flows is provided within the main flowmeter structure 82. An upstream cone 84 comprises a plurality of support beams 84a and a ring portion 84b which is connected to the support beams 84a, and the upstream cone 84 is fixed to the main flowmeter structure 82 so that the ring portion 84b is fitted into a stepped portion 83a located on the upstream side of the flow passage 83. A downstream cone 85 is provided on the downstream side of the flow passage 83. The downstream cone 85 comprises a plurality of support beams 85a and a ring portion 85b connected to the support beams 85a, and the downstream cone 85 is fixed to the main flowmeter structure 82 so that the ring portion 85b is fitted into a stepped portion 83b located on the downstream side of the flow passage 83.

A turbine rotor (impeller) 86 is provided between the upstream cone 84 and the downstream cone 85. The turbine rotor 86 comprises a hub 88, a plurality of blades 87 provided on the outer peripheral surface of the hub 88, and a rotary shaft 89 which penetrates the hub 88 and is fixed thereto. In addition, one end of the rotary shaft 89 is axially supported by a pivot bearing 90 which is provided within a depression 84c of the upstream cone 84, and the other end of the rotary shaft 89 is axially supported by a pivot bearing 91 which is provided within a depression 85c of the downstream cone 85.

Lubricating oil supplying parts 92 and 93 containing a lubricating oil are provided within the upstream and downstream cones 84 and 85, respectively. The lubricating oil from the lubricating oil supplying parts 92 and 93 are respectively supplied to the pivot bearings 90 and 91. Since the lubricating oil supplying parts 92 and 93 have the same the construction, only the construction of the lubricating oil supplying part 92 provided within the upstream cone 84 will be shown and described, and the illustration and description on the lubricating oil supplying part 93 will be omitted.

Figure 14:
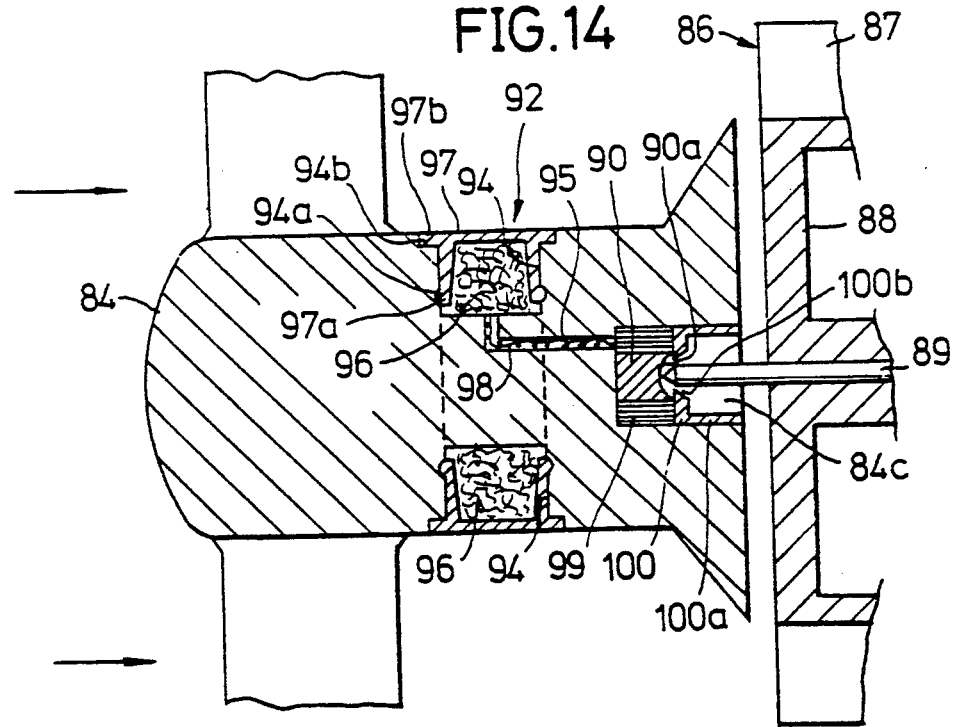
FIG. 14 is a view in vertical cross section showing an essential part of the third embodiment.

As shown in FIG. 14, a ring shaped groove 94 is formed in the outer peripheral surface of the upstream cone 84 which is provided with the lubricating oil supplying part 92, and a communicating hole 95 communicates the groove 94 to the depression 84c.

A filling member 96 infiltrated with a lubricating oil is accommodated within the groove 84. The filling member 96 may be made of cotton yarn, glass fiber, resin fibers and the like. The groove 94 is closed by a sealing member 97. The sealing member 97 is made of a rubber such as nitrile rubber and urethane rubber having a high sealing characteristic or a synthetic resin such as polyethylene. The sealing member 97 fits into the groove 94 so as to prevent the lubricating oil from leaking from the groove 94. The sealing member 97 comprises a projecting portion 97a which engages an engaging groove 94a within the groove 94 so that the sealing member 97 is prevented from slipping out of the groove 94 and the filling member 96 is positively held within the groove 94. In addition, the sealing member 97 comprises a flange portion 97b which fits within a stepped portion 94b formed on the two edge portions of the groove 94, and the surface of the sealing member 97 substantially coincides with the outer peripheral surface of the upstream cone 84 so as not to disturb the flow of the fluid.

A fiber yarn 98 is inserted into the communicating hole 95, and one end of the fiber yarn 98 connects to the filling member 96 within the groove 94 while the other end of the fiber yarn 98 projects within the peripheral portion of the depression 84c. A filling member 90 infiltrated with a lubricating oil is accommodated within the depression 84c around the periphery of the pivot bearing 90.

A ring shaped cap 100 is fitted into the depression 84c so that an outer peripheral portion 100a of the cap 100 makes contact with the inner wall of the depression 84c, and holds the filling member 99 within the depression 84c. The rotary shaft 89 penetrates a tapered hole 100b in the cap 100, and a minute gap is formed between the rotary shaft 89 and the edge of the tapered hole 100b. For this reason, the cap 100 prevents the lubricating oil of the filling member 99 from leaking to the outside, and also prevents external dust particles and the like from adhering onto the pivot bearing 90.

Since the cap 100 is fitted into the depression 84c, volatilized lubricating oil occupies a space between the cap 100 and the pivot bearing 90.

When measuring the flow quantity of the fluid, the rotary shaft 89 rotates together with the turbine rotor 86 in a state where the ends of the rotary shaft 89 are supported by hemispherical bearing surfaces 90a and 91a of the pivot bearings 90 and 91. The lubricating oil from the filling member 99 is supplied in small quantities to the bearing surfaces 90a and 91a due to capillarity. In addition, because the volatilized lubricating oil occupies the space between the cap 100 and the pivot bearing 90, the lubricating oil adheres onto the surface of the rotary shaft 89. Accordingly, the rotary shaft 89 rotates stably and smoothly together with the turbine rotor 86 when measuring the flow quantity of the fluid. Furthermore, it is possible to reduce the friction between the rotary shaft 89 and the bearing surfaces 90a and 91a and thus extend the serviceable life of the turbine flowmeter 81.

When the lubricating oil of the filling member 99 is supplied to the bearing surface 90a, the lubricating oil of the filling member 96 within the groove 94 is supplied to the filling member 99 through the fiber yarn 98 within the communicating hole 95 due to capillarity. In other words, when the lubricating oil of the filling member 99 within the depression 84c is used, the lubricating oil of the filling member 96 within the groove 94 is automatically supplied to the filling member 99. Therefore, it is possible to continuously supply the lubricating oil to the bearing surfaces 90a and 91a for a long period of time by employing the relatively simple construction, and there is no need to frequently carry out the maintenance such as replenishing the lubricating oil. As a result, the turbine flowmeter 81 can continuously and stably measure the flow quantity of the fluid for a long period of time.

In the present embodiment, the filling member 96 is accommodated within the ring shaped groove 94 in the outer peripheral surface of the upstream and downstream cones 84 and 85. However, the shape of the groove 94 is not limited to the ring shape and the groove 94 may have any other appropriate shapes. In addition, the provision of the communicating hole 95 is not limited to one location, and a plurality of such communicating holes may be provided at different locations.

Figure 15B:
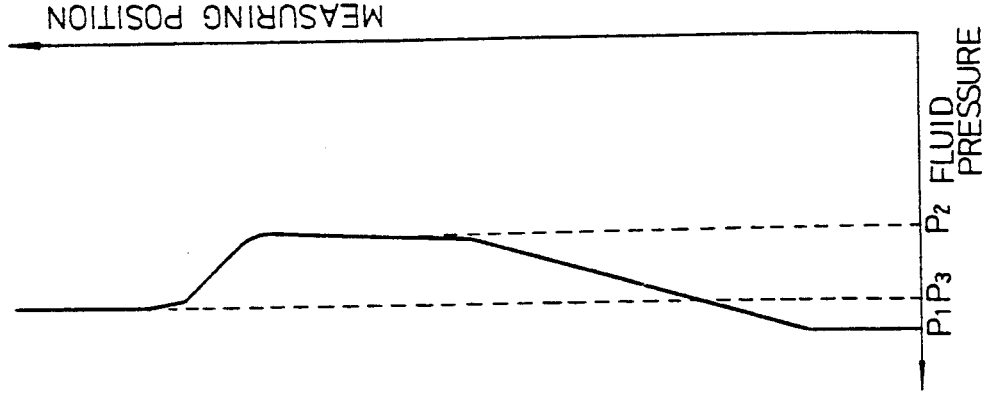
FIG. 15B shows a fluid pressure versus measuring position characteristic of the fourth embodiment shown in FIG. 15A.
Figure 15A:
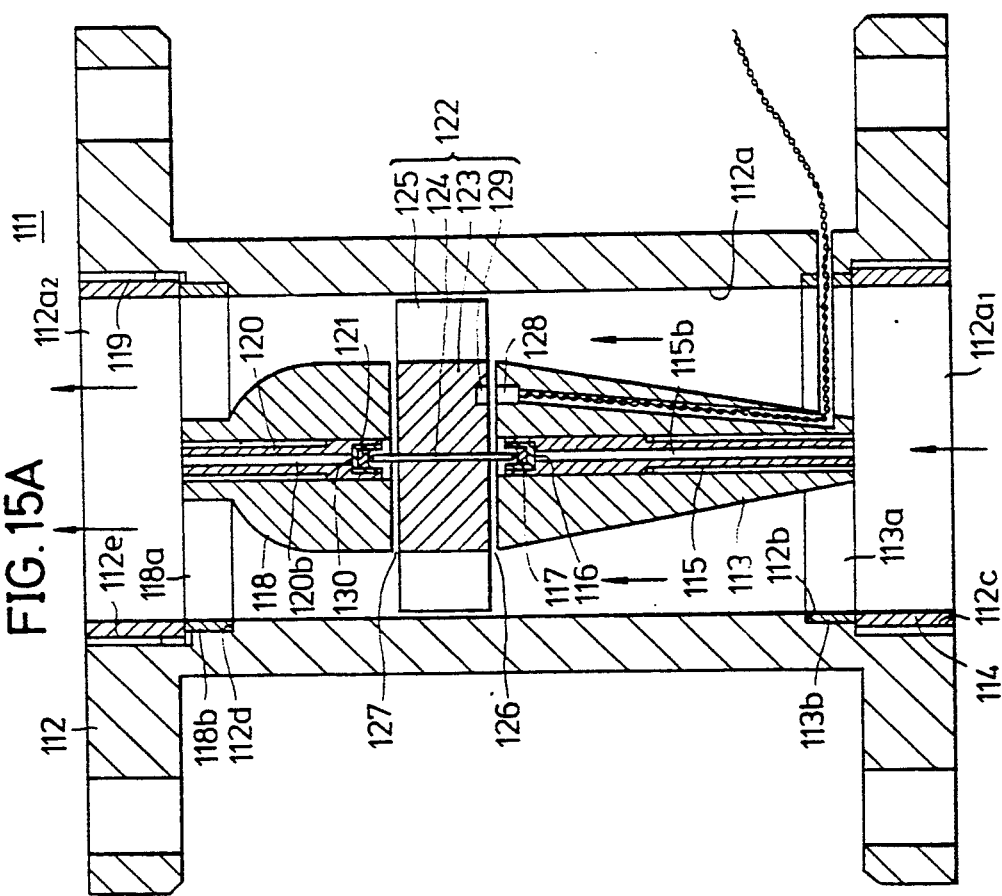
FIG. 15A is a view in vertical cross section showing a fourth embodiment of the turbine flowmeter according to the present invention.

Next, a description will be given on a fourth embodiment of the turbine flowmeter according to the present invention by referring to FIGS. 15A and 15B. FIG. 15A generally shows the fourth embodiment, and FIG. 15B shows a fluid pressure versus measuring position characteristic of the fourth embodiment.

In FIG. 15A, a turbine flowmeter 111 comprises a main flowmeter structure 112, and a flow passage 112a through which a fluid to be measured flows is provided within the main flowmeter structure 112. An upstream cone 113 comprises a plurality of support beams 113a and a ring portion 113b which is connected to the support beams 113a. The upstream cone 113 is inserted into the flow passage 112a from a lower part of the main flowmeter structure 112. The ring portion 113b of the upstream cone 113 is fitted into a stepped portion 112b located on the upstream side of the flow passage 112a, and the upstream cone 113 is fixed in position by a securing ring 114 which is screwed into an internal thread portion 112c provided at the lower part of the main flowmeter structure 112.

A bearing metal fitting 115 is screwed into and fixed in a core portion of the upstream cone 113. As shown in FIG. 16, the bearing metal fitting 115 is a hollow piece comprising a bearing mounting portion 115a provided on an upper end thereof, and a pressure introducing hole 115b penetrating the bearing metal fitting 115 in an axial direction thereof. One end of the pressure introducing hole 115b opens to the upstream side of the upstream cone 113, and the other end of the pressure introducing hole 115b communicates to the bearing mounting portion 115a. A holder 116 made of a porous material such as sintered metal is provided in the bearing mounting portion 115a. The holder 116 is infiltrated with a lubricating oil, and a depression 116a is provided on top of the holder 116 in FIG. 15A.

A pivot bearing 117 made of a cemented carbide or a gem such as sapphire is embedded within the depression 116a of the holder 116. A hemispherical bearing surface 117a is formed on the top of the pivot bearing 117 in FIG. 15A.

A downstream cone 118 is inserted into the flow passage 112a of the main flowmeter structure 112 from an upper part of the main flowmeter structure 112. The downstream cone 118 has a plurality of support beams 118a and a ring portion 118b connected to the support beams 118a, and the ring portion 118b is fitted into a stepped portion 112d of the main flowmeter structure 112. In addition, the downstream cone 118 is fixed in position by a securing ring 119 which is screwed into an internal thread portion 112e provided at the upper part of the main flowmeter structure 112.

A bearing metal fitting 120 is screwed into and fixed in a core portion of the downstream cone 118. As shown in FIG. 16, the bearing metal fitting 120 is a hollow piece comprising a bearing mounting portion 120a provided on an upper end thereof, and a pressure introducing hole 120b penetrating the bearing metal fitting 120 in an axial direction thereof. One end of the pressure introducing hole 120b opens to the downstream side of the downstream cone 118, and the other end of the pressure introducing hole 120b communicates to the bearing mounting portion 120a. A holder 130 made of a porous material such as sintered metal is provided in the bearing mounting portion 120a. The holder 130 is infiltrated with a lubricating oil, and a depression 130a is provided below the holder 130 in FIG. 15A.

A pivot bearing 121 made of a cemented carbide or a gem such as sapphire is embedded within the depression 130a of the holder 130. A hemispherical bearing surface 121a is formed on the pivot bearing 121. The pivot bearing 121 is also made of a cemented carbide or a gem such as sapphire.

A turbine rotor (impeller) 122 comprises a rotor hub 123, a rotary shaft 124 which penetrates a center hole in the rotor hub 123 and is fixed to the rotor hub 123, and a plurality of blades 125 fixed on an outer peripheral surface of the rotor hub 123. The rotary shaft 124 is made of a cemented carbide or steel, and both ends 124a and 124b of the rotary shaft 124 have an approximately hemispherical shape. The rotary shaft 124 is axially supported in a state where the ends 124a and 124b are supported on the bearing surfaces 117a and 121a of the respective pivot bearings 117 and 121.

A gap 126 is formed between the lower surface of the rotor hub 123 and the upper surface of the upstream cone 113, and a gap 127 is formed between the upper surface of the rotor hub 123 and the lower surface of the downstream cone 118.

A magnetic sensor 128 which is used as a pickup is embedded in the upper surface of the upstream cone 113, and a magnet 129 is embedded in the lower surface of the rotor hub 123 at such a position that the magnet 129 confronts the magnetic sensor 128 at a predetermined rotational position of the rotor hub 123. Accordingly, the flow quantity of the fluid flowing through the flow passage 112a is measured by magnetically detecting by use of the magnetic sensor 128 the magnet 129 which rotates together with the turbine rotor 122 depending on the flow quantity of the fluid.

The fluid pressure distribution of the fluid which flows through the flow passage 112a along the axial direction of the main flowmeter structure 112 becomes as shown in FIG. 15B, where the ordinate indicates the measuring position along the axial direction of the main flowmeter structure 112 in correspondence with FIG. 15A and the abscissa indicates the fluid pressure. When FIG. 15B is observed in correspondence with FIG. 15A, it may be seen that the fluid pressure is $P_1$ at an entrance 112a1 of the main flowmeter structure 112, and that the fluid pressure gradually decreases to $P_2$ in a vicinity of the turbine rotor 122 because the area of the flow passage 112a (when the main flowmeter structure 112 is cut along a plane approximately perpendicular to the direction of fluid flow) decreases from the upstream cone 113 toward the turbine rotor 122. In addition, the fluid pressure gradually increases to $P_3$ at an exit 112a2 of the main flowmeter structure 112 because the area of the flow passage 112a (when the main flowmeter structure 112 is cut along a plane approximately perpendicular to the direction of the fluid flow) increases from the turbine rotor 122 toward the end of the downstream cone 118 at the exit 112a2.

In other words, the fluid pressures $P_1$, $P_2$ and $P_3$ at the different measuring positions within the flow passage 112a satisfy a relation $P_1 > P_3 > P_2$. Hence, the fluid pressure $P_2$ in the vicinity of the turbine rotor 122 is the smallest compared to the fluid pressures $P_1$ and $P_3$ at the other measuring positions. The fluid pressures at the gap 126 between the hub 123 and the upstream cone 113 and at the gap 127 between the hub 123 and the downstream cone 118 are also $P_2$.

The fluid pressure $P_1$ at the entrance 112a1 is introduced into the pressure introducing hole 115b of the bearing metal fitting 115 on the upstream side. For this reason, the fluid pressure $P_1$ acts on a lower surface 116b of the holder 116, and the pressure $P_2$ acts on an upper end surface 116c and an inner wall 116d of the depression 116a.

On the other hand, the fluid pressure $P_3$ at the exit 112a2 is introduced into the pressure introducing hole 120b of the bearing metal fitting 120 on the downstream side. Accordingly, the fluid pressure $P_3$ acts on an upper surface 130b of the holder 130, and the fluid pressure $P_2$ acts on a lower end surface 130c and an inner wall 130d of the depression 130a.

Since a pressure difference is introduced between the two sides of each of the holders 116 and 130, the lubricating oil of the holder 116 and 130 is supplied in small quantities to the side with the lower fluid pressure. That is, the lubricating oil which oozes out to the end surface 116c and 130c and the inner walls 116d and 130d of the holders 116 and 130 is constantly supplied to the bearing surfaces 117a and 121a contacted by the respective ends 124a and 124b of the rotary shaft 124.

Therefore, the rotary shaft 124 is stably supported by the pivot bearings 117 and 121 and can rotate smoothly. In addition, since the lubricating oil is constantly supplied in small quantities to the ends 124a and 124b of the rotary shaft 124 and to the bearing surfaces 117a and 121a, the friction between the end 124a and the bearing surface 117a and the friction between the end 124b and the bearing surface 121a are reduced, thereby extending the serviceable life of the turbine flowmeter 111. Furthermore, because the lubricating oil of the holders 116 and 130 is automatically supplied to the bearing surfaces 117a and 121a in small quantities continuously for a long period of time, the maintenance of the turbine flowmeter 111 is facilitated and the same measuring accuracy can be guaranteed for a long period of time.

The lubricating oil will not be supplied in large quantities, and it is therefore possible to prevent the lubricating oil from being scattered to the surroundings when the rotary shaft 124 rotates. Moreover, it is possible to prevent a resistance on the rotating rotary shaft 124 which would occur if the lubricating oil is supplied in excess.

FIG. 17 shows a modification of the fourth embodiment. In FIG. 17, those parts which are the same as those corresponding parts in FIG. 16 are designated by the same reference numerals, and a description thereof will be omitted. In FIG. 17, a pivot bearing 131 made of a porous material such as sintered metal is provided directly in the bearing mounting portion 115a of the bearing metal fitting 115. A hemispherical bearing surface 131a for supporting the end 124a of the rotary shaft 124 is formed on an upper surface of the pivot bearing 131. Similarly, a pivot bearing 132 made of a porous material such as sintered metal is provided directly in the bearing mounting portion 120a of the bearing metal fitting 120. A hemispherical bearing surface 132a for supporting the end 124b of the rotary shaft 124 is formed on a lower surface of the pivot bearing 132. Each of the pivot bearings 131 and 132 are infiltrated with a lubricating oil.

Accordingly, the fluid pressure $P_1$ within the pressure introducing hole 115b acts on a lower surface 131b of the pivot bearing, and the fluid pressure $P_2$ acts on the bearing surface 131a. On the other hand, the fluid pressure $P_3$ within the pressure introducing hole 120b acts on an upper surface 132b of the pivot bearing 132, and the fluid pressure $P_2$ acts on the bearing surface 132a. Hence, the lubricating oil of the pivot bearings 131 and 132 oozes out to the bearing surfaces 131a and 132a due to the pressure difference introduced between the two sides of each of the pivot bearings 131 and 132. The lubricating oil is always automatically supplied in small quantities to the bearing surfaces 131a and 132a, and the rotary shaft 124 can rotate stably and smoothly.

Figure 18:
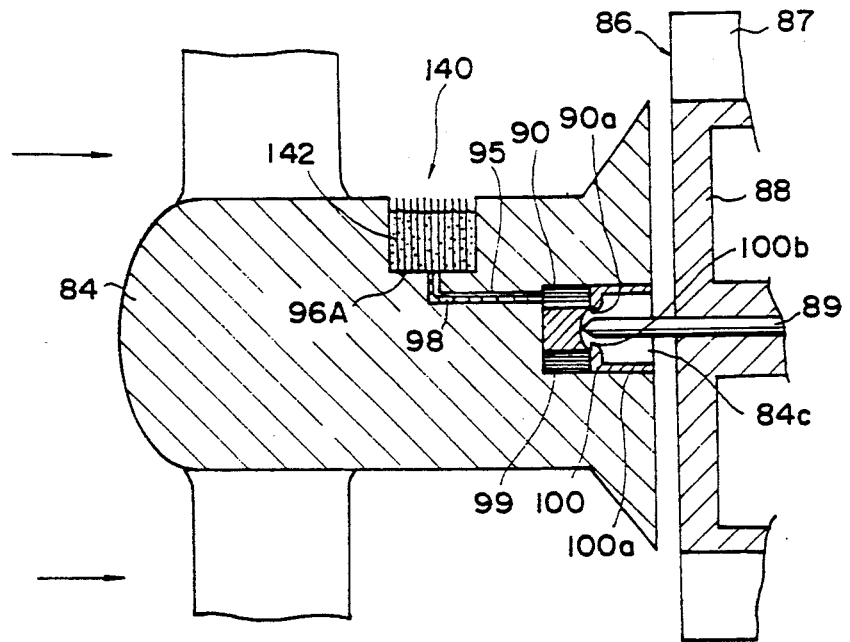
FIG. 18 is a view in vertical cross section showing an essential part of a fifth embodiment of the turbine flowmeter according to the present invention.

FIG. 18 shows an essential part of a fifth embodiment of the turbine flowmeter according to the present invention. The fifth embodiment of the turbine flowmeter has the same general construction as the third embodiment shown in FIGS. 13 and 14. In FIG. 18, those parts which are the same as those corresponding parts in FIGS. 13 and 14 are designated by the same reference numerals, and a description thereof will be omitted.

In FIG. 18, a lubricating oil supplying part 140 is provided within the upstream cone 84. Another lubricating oil supplying part is provided within the downstream cone 85 having the same construction as the lubricating oil supplying part 140 within the upstream cone 84. However, for the simplicity of disclosure, only the construction of the lubricating oil supplying part 140 provided within the upstream cone 84 will be shown and described. The lubricating oil from the lubricating oil supplying part 140 is supplied to the pivot bearing 90.

As shown in FIG. 18, the lubricating oil supplying part 140 comprises a recess 96A formed in the outer peripheral surface of the upstream cone 84, and the communicating hole 95 communicates the recess 96A to the pivot bearing 90. The recess 96A opens to the flow passage and accommodates a capillary member 142 which is constituted by capillaries containing the lubricating oil. The lubricating oil within each capillary 142 has an oil surface.

Figure 19:
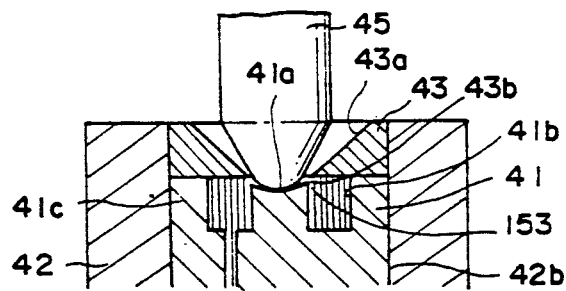
FIG. 19 is an enlarged view showing a bearing part of the fifth embodiment.

FIG. 19 shows an enlarged view of the bearing part of the fifth embodiment shown in FIG. 18. In FIG. 19, the pivot bearing 41 is embedded in the bearing hole 42b of the bearing metal fitting 42 and the ring shaped cap 43 having the hole 43a is fitted on top of the pivot bearing 41 so that the ring shaped groove 41b communicated with the outside of the turbine flowmeter only through a minute gap 153 between the lower edge 43b of the tapered center hole 43a and the bearing surface 41a of the pivot bearing 41.

Figure 20:
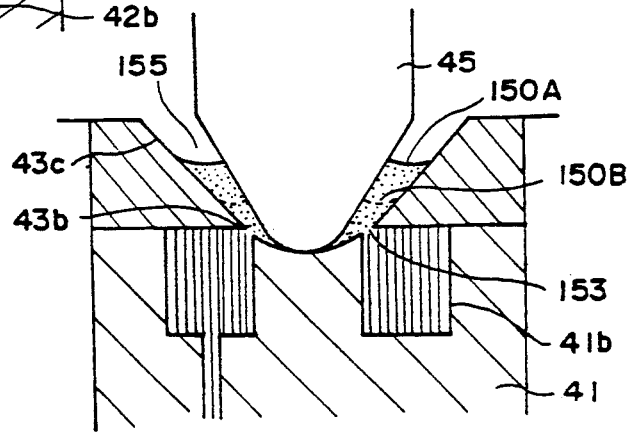
FIG. 20 is a diagram for explaining the function of the fifth embodiment.

As shown in FIG. 20, the ring shaped groove 41b of the pivot bearing 41 accumulates a lubricating oil. Accordingly, the lubricating oil is supplied into a space 155 formed between a tapered surface 43C of the center hole 43a and the tip end of the rotary shaft 45 in small quantities due to the capillarity introduced in the minute gap 153.

In the normal state, an oil surface of the lubricating oil within the space 155 has a level indicated by a solid line 150A. In this case, the surface tensions of the oil surfaces in the space 155 and in the capillary member 142 and the weight of the lubricating oil between the oil surfaces are balanced, so that the lubricating oil does not flow between the capillary member 142 and the space 155 and the tip end of the rotary shaft 45 dips into a suitable amount of lubricating oil.

When the lubricating oil in the bearing part reduces due to, for example, the evaporation, the oil surface of the lubricating oil within the space 155 lowers down to a level indicated by a broken line 150B. In this case, since the surfaces of the tip end of the rotary shaft 45 and of the center hole 43a of the ring shaped cap 43 defining the space 155 are tapered so that the distance between the surfaces of the tip end of the rotary shaft 45 and the center hole 43a of the ring shaped cap 43 become narrower toward the minute gap 153, the area of the oil surface reduces, and thus the surface tension of the oil surface increases. Accordingly, the surface tensions and the weight of the lubricating oil become out of the balance, so that the level of the lubricating oil rises within the space 155. In other words, the lubricating oil is supplied to the bearing part from the capillary member 142 to compensate for the reduction in the lubricant oil within the space 155.

In the fifth embodiment of the present invention, a suitable small amount of lubricant oil is supplied to the bearing part from the capillary member 142 only when the lubricant oil in the bearing part reduces. The amount and level 150A of lubricant oil in the bearing part are suitably controlled by appropriately designing the diameter of capillary 142 and the distance between the surfaces of the tip end of the rotary shaft 45 and of the center hole 43a. For this reason, the lubrication can be carried out continuously for a long period of time, thereby simplifying the maintenance of the turbine flowmeter such as replenishing the lubricating oil, and the lubricating oil will not be scatter to the surroundings of the bearing part.

In addition, since the amount of lubricating oil within the space 155 is substantially small, the lubricating oil will not overflow outside the space 155 and will remain in the space 155 even when the rotary shaft 45 slightly tilts or deviates from its intended position.

In the case where the rotary shaft 45 is once removed from the bearing part and is restored on the bearing surface 41a, the tip end of the rotary shaft 45 is applied with a small quantity of lubricating oil before the restoration and is then made contact with the bearing surface 41a so that a capillarity is introduced in the space 155 to suck up the lubricating oil within the ring shaped groove 41b to the level indicated by the solid line 150A.

Figure 21:
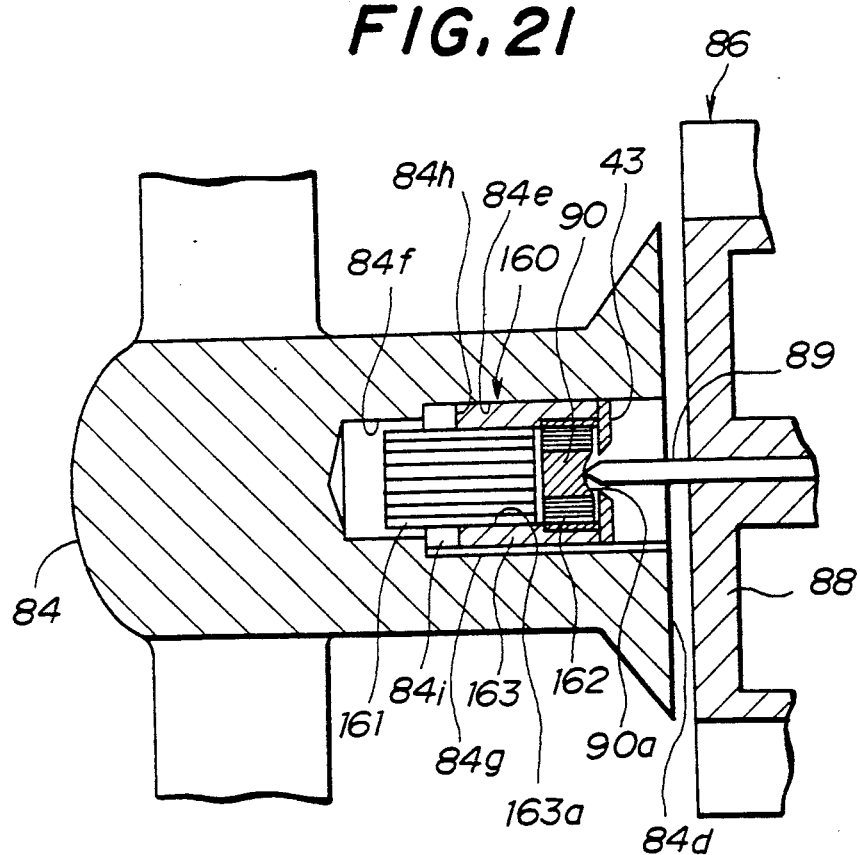
FIG. 21 is a view in vertical cross section showing an essential part of a sixth embodiment of the turbine flowmeter according to the present invention.

FIG. 21 shows a sixth embodiment of the turbine flowmeter according to the present invention.

In FIG. 21, at the center of an end face 84d of an upstream side cone 84 which is faced by a hub 88 of a turbine rotor 86, a mounting hole 84e for holding the bearing is provided axially. A bearing unit 160 is fixedly inserted in the mounting hole 84e of the upstream side cone 84.

The bearing unit 160 is composed of a pivot bearing 90 which axially supports a rotary shaft 89 of the turbine rotor 86, a oil accumulating means 161 provided at the back of the pivot bearing 90, a oil supplying means 162 which penetrates the pivot bearing 90 and which is provided on the outer peripheral side of the bearing face 90, and a cylindrical holding means 163 which holds the pivot bearing 90 and the first and second supplying means 161 and 162 so that they are all directly communicated.

Further, at the open end of the mounting hole 84e, a disc cap 43 with a tapered enter hole 43a is fixedly inserted.

FIG. 21 shows the construction of the upstream side cone 84 only. As to the construction of the downstream side cone 85, it is identical to the one shown in FIG. 21 and therefore the description of it will be omitted.

Figure 22:
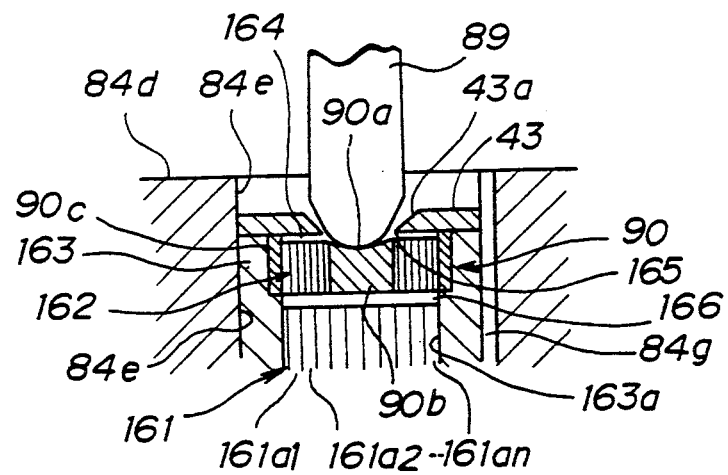
FIG. 22 is an enlarged view showing a bearing part of the sixth embodiment.

As shown in FIG. 22, the oil accumulating means 161 is an aggregate of capillaries 161a integrated so that a number of capillaries 161a ($161a_1 \ldots 161a_n$) will extend axially and a lubricating oil is filled within each of the capillaries 161a. Further, one end of each of the capillaries 161a is fixedly inserted in the hollow portion 163a of the cylindrical holding member 163, and the other end is inserted in a back portion 84f of the mounting hole 84e. On the inner wall of the mounting hole is formed a groove 84g, one end of which opens into the end face 84d and extends axially, and on a stepped portion 84h of the mounting hole 84e is formed a groove 84i which communicates to the groove 84g and extends radially. Accordingly, the back portion 84f of the mounting hole 84e communicates via the grooves 84g and 84i to a flow passage 83 so that the pressure of the flow passage 83 is introduced to the back portion 84f. The holding means 163 is fixedly inserted in a state where the end portion of the mounting hole 84e is in contact with the step portion 84h, and the contact position is determined by the stepped portion 84h.

Figure 23:
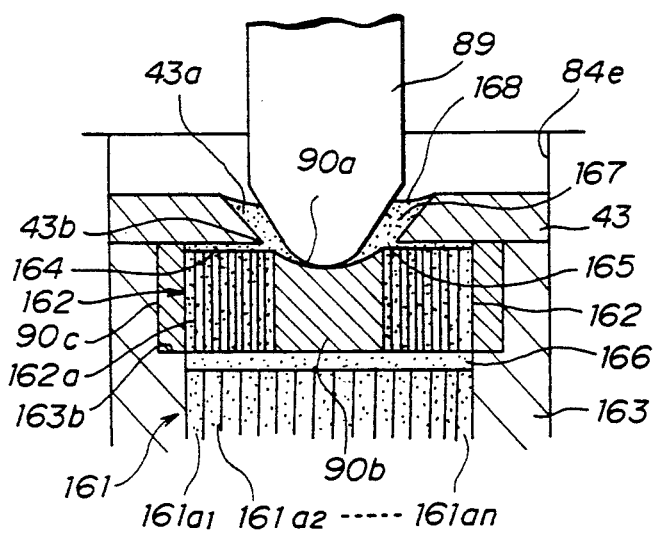
FIG. 23 is a diagram for explaining the function of the sixth embodiment.
Figure 24:
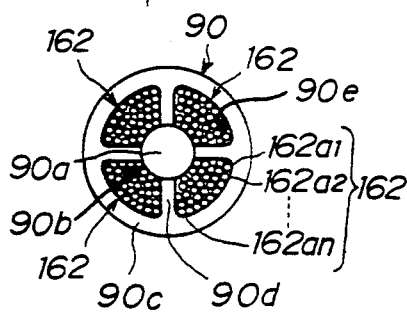
FIG. 24 is a plan view showing a pivot bearing of the sixth embodiment.

As shown in FIGS. 23 and 24, the pivot bearing 90 comprises a bearing body 90b having a bearing surface 90a formed as a hemispherical concave portion, a ring shaped outer cylinder 90c provided outside of the bearing body 90b, and four columns 90d which communicate the bearing body 90b to the outer cylinder 90c integrally. Between the outer periphery of the bearing body 90b and the inner periphery of the outer cylinder 90c, there is formed a fan-shaped space 90e which is partitioned by the column 90d and penetrates the pivot bearing 90.

The aforementioned oil supplying means 162 is housed in the space 90e which is formed outside the bearing body 90b. The oil supplying means 162 has a construction similar to the oil accumulating means 161, that is, an aggregate of capillaries 162a integrated so that a number of capillaries 162a extend axially.

Each of the capillaries 162a has a smaller diameter than that of the capillaries 161a of the above oil accumulating means 161, and the lubricating oil is filled inside of the capillaries 162a. Further the entire length of each of the capillaries 162a has a dimension which is almost the same as that of the peripheral portion of the bearing body 90 and which is a little shorter than the outer cylinder 90c.

Because the disc cap 43 which is fixedly inserted in the open end of the mounting hole 84e makes contact with the end face of the outer cylinder 90c, there is a gap between the cap 43 and each of the capillaries 162a. Therefore, the lubricating oil filled in each capillary 162a first overflows into the gap 164, and is then supplied to the bearing surface 90a through an annular opening 165 formed between an angular portion 43b in the lower part of a center hole 43a of the disc cap 43 and the peripheral portion of the bearing surface 90a.

Further, the pivot bearing 90 is fixedly inserted in a stepped portion 163b where the outer cylinder 90c is formed at the open end of the holding member 163. Accordingly, the contact position of the pivot bearing 90 is determined by the stepped portion 163b, thereby ensuring that there is always a certain small gap between the oil accumulating means 161 and second oil accumulating means 162.

Therefore, the oil accumulating means 161 is directly connected to the oil supplying means by the oil accumulating chamber 166 which forms this certain small space. The oil accumulating chamber serves to communicate each of the pipes 162a (162a₁ ... 162aₙ) to all the pipes 161a (161a₁ ... 161aₙ) so that the oil accumulating means is directly connected to the oil supplying means.

As a result, when the lubricating oil filled in the capillaries 162a is supplied to the bearing surface 90a, the lubricating oil in the capillaries 161a is supplied to the capillaries 162a through the oil accumulating chamber 166 due to capillarity. When the end portion of a rotary shaft 89 is in contact with the bearing surface 90a of the pivot bearing 90, the lubricating oil in the oil supplying means 162 is supplied in small quantities to the bearing surface 90a due to the capillarity of the capillaries 162a. For this reason, in the space 167 between the center hole 43a of the bearing surface 90a and the disc cap 43 and the end portion of the rotary shaft 89, a meniscus 168, made of a certain quantity of lubricating oil supplied from oil supplying means 162, is formed.

The surface tension of the meniscus 168 is balanced with the surface tension at the back side open end of each of the capillaries 161a of the oil accumulating means 161 and a water head of the back side end portion of the meniscus 168 and the capillaries 161a. Therefore, by varying dimensions of the internal diameters of the capillaries 161a and 162a, the size of the meniscus 168 can be adjusted. For example, to reduce the quantity of the lubricating oil supplied to the bearing surface 90a by making the meniscus 168 smaller, it is necessary to replace the capillaries 161 with capillaries having a smaller internal diameter so as to increase the surface tension of the lubricating oil at the open end of the capillaries 161.

During the measurement of a flow quantity, the rotary shaft 89 which rotates with the turbine rotor 86 can rotate smoothly and stably while making contact with the meniscus 168 formed on the bearing surface 90a of the pivot bearing 90. Since the meniscus 168 is designed to have a minimum size required for the lubrication of the rotary shaft 89, even if the rotary shaft 89 rotates while measuring the flow quantity, the lubricating oil on the bearing surface 90a will not disperse. However, the lubricating oil will gradually volatilize from the surface of the meniscus 168. In this way, when the lubricating oil decrease and the meniscus 168 becomes smaller, the lubricating oil of the oil supplying means 162 is supplied in small quantities to the bearing surface 90a through a gap 164 and an opening 165, and this operation continues until the surface tension of the meniscus 168 and that at the open end of the capillaries 161a becomes balanced with each other.

Figure 25:
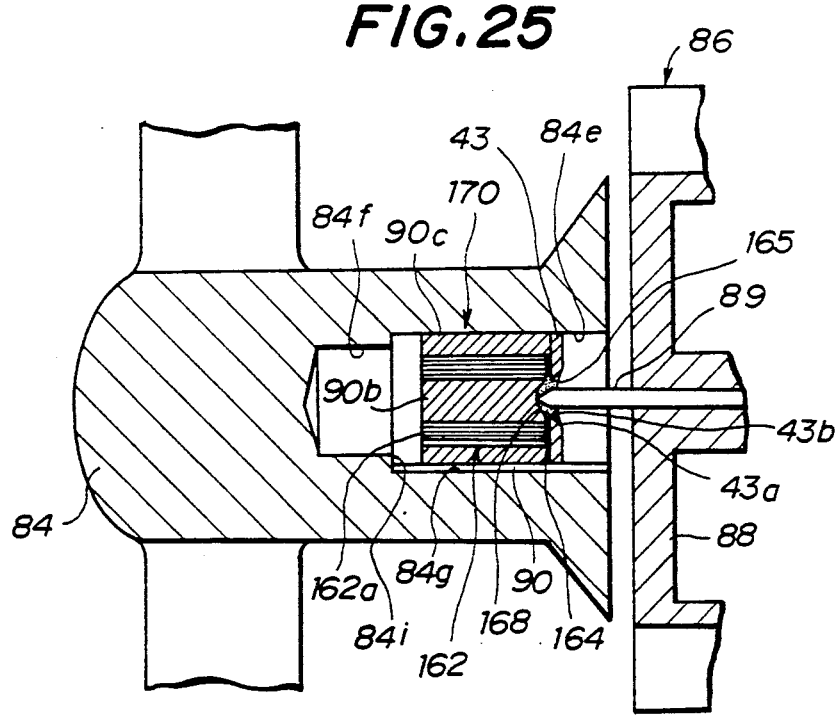
FIG. 25 is a view in vertical cross section showing an essential part of a modification of the sixth embodiment.

FIG. 25 shows a modification of the sixth embodiment of the present invention. In FIG. 25, a bearing unit 170 is fixedly inserted in the mounting hole 84e of the upstream side cone 84. This bearing unit 170 is identical in construction to the pivot bearing 90 shown in FIG. 24 and the outer cylinder 90c of the pivot bearing 90 is adapted to fit into the mounting hole 84e. The lubricating oil filled in the oil accumulating means 162 (an aggregate of the capillaries 162a) which is arranged at the outer periphery of the bearing surface 90a, is supplied to the bearing surface 90a due to capillarity at the small opening 165 formed between the peripheral portion of the bearing surface 90a and the open angular portion 43b of the disc cap 43 and a center hole 43a.

The meniscus 168, which is formed on the bearing surface 90a, is designed to have a size which achieves a balance between a surface tension of the meniscus 168 and that at the open end side of the capillaries 162a. Therefore, when the lubricating oil on the bearing surface 90a decreases and the meniscus 168 becomes smaller, the lubricating oil in the capillaries 162a will be supplied in small quantities to the bearing surface 90a through the gap 164 and the opening 165 until the surface tension of the meniscus 168 and that at the open end side of each of the capillaries 162a becomes balanced with each other.

Further, the present invention is not limited to these embodiments, but various variations and modifications may be made without departing from the scope of the present invention.

What is claimed is:

1. A turbine flowmeter comprising:
   an impeller rotatably provided within a flow passage through which a fluid to be measured flows, said impeller comprising a rotary shaft which rotates together with said impeller;
   a pair of bearing means having bearing surfaces for axially supporting said rotary shaft;
   a holding means for holding said bearing means and provided on the flow passage;
   an oil accumulating space defined by an end portion of said rotary shaft and bearing surfaces facing respective sides of the end portion;
   an oil accumulating means provided on said holding means and filled with the lubricating oil to be supplied to said oil accumulating space; and
   an oil supplying means for supplying oil to said oil accumulating space which means comprises a capillary means connected on one end direct to said oil accumulating means and communicated on the other end to said space,
   wherein the lubricating oil is supplied to said space via said oil supplying means from oil accumulating means by capillarity introduced in said oil accumulating means and said space by the action of said capillary means, and wherein the surface tension of the lubricating oil in said space is equal to or larger than the surface tension of the lubricating oil in said oil accumulating means.

2. A turbine flowmeter as claimed in claim 1 in which said oil accumulating means is an aggregate of a number of capillaries, each of the capillaries being filled with the lubricating oil.

3. A turbine flowmeter as claimed in claim 1 in which said oil supplying means is provided axially of said bearing means, said oil accumulating means adjoining an end portion of said bearing means and being connected to one end of said oil supplying means.

4. A turbine flowmeter as claimed in claim 1 which further comprises cylindrical holding means having a hollow portion, said oil accumulating means being fixedly inserted in an opening on one side of a cylindrical holding means, said oil supplying means and said bearing means being fixedly inserted in the other opening of said holding means and integrally held thereto.

5. A turbine flowmeter as claimed in claim 1 in which said oil supplying means comprises a plurality of capillaries, each of said capillaries being filled with the lubricating oil.

6. A turbine flowmeter as claimed in claim 1 which further comprises an axially extending space located at the outer periphery of said bearing surfaces of said bearing means, said oil supplying means being provided in said space.

7. A turbine flowmeter as claimed in claim 1 which further comprises a disc shaped member having a center hole located in a vicinity of the bearing surfaces of said bearing means via a gap, so that the lubricating oil from said oil supplying means is supplied to the bearing surfaces through the opening between said bearing surfaces and said center hole.

8. A turbine flowmeter as claimed in claim 7 in which said disc shaped member is provided so that the center hole has a slightly larger diameter than that of said rotary shaft, said center hole having a tapered shape which corresponds to the shape of a tip of said rotary shaft.

9. A turbine flowmeter as claimed in claim 7 in which said oil supplying means comprises oil accumulating means is provided in an outer periphery of a bearing surface of said bearing means, being located in a vicinity of an end portion of said oil supplying means via a gap and forming an opening as a capillary means between the center hole of said disc shaped member and the peripheral portion of said bearing surfaces.

* * * * *